United States Patent [19]

Takao et al.

[11] Patent Number: 5,294,485
[45] Date of Patent: Mar. 15, 1994

[54] ORGANIC COMPOSITE COATED STEEL STRIP HAVING IMPROVED CORROSION RESISTANCE AND WELDABILITY

[75] Inventors: Kenji Takao; Hideo Ohgishi; Hajime Kimura; Shuichi Sakaguchi, all of Chiba, Japan

[73] Assignee: Kawasaki Steel Corporation, Japan

[21] Appl. No.: 598,839

[22] Filed: Oct. 16, 1990

[30] Foreign Application Priority Data

Oct. 16, 1989 [JP] Japan .................................. 1-268478
Feb. 19, 1990 [JP] Japan .................................. 2-37956

[51] Int. Cl.$^5$ ........................ B32B 15/08; B32B 15/00
[52] U.S. Cl. .................................. 428/626; 428/632; 428/659
[58] Field of Search ............... 428/622, 623, 626, 659, 428/331, 413, 632

[56] References Cited

U.S. PATENT DOCUMENTS

| | | | |
|---|---|---|---|
| 4,049,781 | 9/1977 | Acker et al. | 428/338 |
| 4,775,600 | 10/1988 | Adaniya et al. | 428/623 |
| 4,804,587 | 2/1989 | Takeuchi et al. | 428/623 |
| 4,985,311 | 1/1991 | Shindou et al. | 428/623 |

FOREIGN PATENT DOCUMENTS

| | | |
|---|---|---|
| 282073 | 9/1988 | European Pat. Off. |
| 298409 | 1/1989 | European Pat. Off. |
| 312599 | 4/1989 | European Pat. Off. |

OTHER PUBLICATIONS

Patent Abstracts of Japan, vol. 13, No. 84 (C-572) (3432) Feb. 27, 1989, JP-A-63-270480.

*Primary Examiner*—Benjamin R. Fuller
*Assistant Examiner*—Valerie Ann Lung
*Attorney, Agent, or Firm*—Austin R. Miller

[57] ABSTRACT

Organic composite coated steel strips having improved corrosion resistance, weldability and coating adherence are obtained when an organic composite layer is applied to a chromate layer on a zinc or zinc base alloy plated steel substrate. The chromate layer containing up to 70% of $Cr^{6+}$ based on the total chromium weight is coated in a weight of 5 to 500 mg/m$^2$ of Cr. The organic composite layer is formed to a dry weight of 0.2 to 3.0 g/m$^2$ from a coating composition comprising (A) a silica sol having silica dispersed in an organic solvent with a water content of up to 3.0%, the silica having an organic deposit on its surface in an amount of up to 5.0% of C based on the total silica weight, the silica having an average particle size of 0.05 to 3.0 μm and a specific surface area of 50 to 800 m$^2$/g, and (B) an organic resin binder having a number average molecular weight of at least 2,000. The coated strips are suitable for use as automobile bodies by press forming.

16 Claims, No Drawings

ORGANIC COMPOSITE COATED STEEL STRIP HAVING IMPROVED CORROSION RESISTANCE AND WELDABILITY

This invention relates to organic composite coated steel strip having improved corrosion resistance and weldability mainly used in automobile body components by press forming.

BACKGROUND OF THE INVENTION

In recent years, to meet increasingly severe corrosion resistance requirements for automobile bodies, surface treated steel strips in the form of conventional cold rolled steel strips plated with zinc or zinc base alloy are often used. Particularly in the area where corrosion is a serious problem, high bare corrosion resistance is needed in internal strip configurations including internal cavity-defining structures and bends where protective coatings after pressing and body assembly cannot fully cover. Organic composite coated steel strips having chromate and organic coatings on a zinc plated steel substrate were developed to meet such needs as disclosed in Japanese Patent Application Kokai Nos. 108292/1982 and 224174/1983.

These proposals are intended to provide high corrosion resistance by coating a zinc plated steel substrate with a coating composition containing a resin and a water dispersed silica sol. However, the use of water dispersed silica sol gives rise to several problems including (1) limitation of the available type of organic resin binder which has to be compatible with the silica sol, (2) the presence of residual water-soluble components in the coating which allow water to penetrate into the coating during subsequent chemical conversion treatment so that chromium in the underlying chromate layer can dissolve out to contaminate the environment, (3) potential separation of the coating during alkali degreasing which can lead to a loss of corrosion resistance, and (4) poor adherence of the coating in that water can penetrate underneath the coating upon exposure to a corrosive environment, allowing the water soluble components to dissolve therein and exhibit high alkalinity cleaving the interfacial bond between the coating and the chromate. These problems are essentially derived from the use of water as the solvent for the coating compositions.

One solution is disclosed in Japanese Patent Application Kokai No. 22637/1988 which uses a coating composition comprising a hydrophobic silica obtained by subjecting silica on its surface to organic substitution in an organic solvent and an epoxy resin having a primary hydroxyl group and a basic nitrogen atom added thereto. Although compatibility is maintained between silica sol and the organic resin and improved adherence after coating is achieved, this coating has no ability to hold corrosion products stably because of the absence of a free silanol group on the silica surface. Therefore, corrosion resistance is materially low. The use of existing silica sol of either a water or organic solvent system adversely affects weldability.

Further, Japanese Patent Application Kokai Nos. 35798/1988 and 65179/1989 discloses addition of dry fumed silica to organic solvents Although corrosion resistance and weldability are improved, the use of fumed silica not only leads to a substantial increase in viscosity of the coating composition which can interfere with control of the coating weight upon its application, but frequently causes aggregation during blending of the coating composition so that the composition cannot be applied.

SUMMARY OF THE INVENTION

The present invention eliminates the above-mentioned problems of the prior art and its object is to provide organic composite coated steel strip having improved corrosion resistance, weldability and coating adherence using a coating composition of a silica sol having a free silanol group in an organic solvent and a resin binder in which the dispersion of silica in the composition is restricted to some extent while keeping the silica sol compatible with the resin binder.

According to the present invention, there is provided an organic composite coated steel strip having improved corrosion resistance and weldability, comprising a zinc or zinc base alloy plated steel substrate, a chromate layer on the substrate containing up to 70% by weight of $Cr^{6+}$ based on the total chromium quantity, said chromate layer being coated in a weight of 5 to 500 $mg/m^2$ of elemental chromium, and an organic composite layer coated on said chromate layer from a coating composition comprising (A) a silica and (B) an organic resin composition having a number average molecular weight of at least 2,000 such that (a) the silica primary particles agglomerate into secondary particles, (b) the number of the secondary particles ranges from $1 \times 10^4$ to $1 \times 10^9$ per square millimeter of a cross section of said organic composite layer, and (c) said organic composite layer has a dry weight of 0.2 to 3.0 $g/m^2$.

According to the present invention, there is provided an organic composite coated steel strip having improved corrosion resistance and weldability, comprising a zinc or zinc base alloy plated steel substrate, a chromate layer on the substrate containing up to 70% by weight of $Cr^{6+}$ based on the total chromium quantity, the chromate layer being coated in a weight of 5 to 500 $mg/m^2$ of elemental chromium, and an organic composite layer coated on said chromate layer from a coating composition comprising (A) a silica sol and (B) an organic resin composition, the organic composite layer being coated in a dry weight of 0.2 to 3.0 $g/m^2$. Silica sol (A) has silica dispersed in an organic solvent with a water content of up to 3.0% by weight, the silica having an organic deposit on its surface in an amount of up to 5.0% by weight, calculated as C, based on the total weight of the silica, the silica having a specific surface area of 50 to 800 $m^2/g$, preferably 100 to 400 $m^2/g$. Organic resin composition (B) has a number average molecular weight of at least 2,000.

Preferably, said silica has an average particle size of 0.05 to 3.0 μm.

Preferably, the organic solvent of silica sol (A) has a total alkali metal content of up to 0.01% by weight. Alternatively, the silica of silica sol (A) has $Al^{3+}$ adhered to the surface of silica in an amount of 0.1 to 20.0% by weight of elemental Al based on the total weight of the silica.

Preferably, organic resin composition (B) is based on an epichlorohydrin-bisphenol A epoxy resin having a number average molecular weight of at least 2,000.

Preferably, the coating composition contains silica sol (A) and organic resin composition (B) in such amounts that 10 to 100 parts by weight of silica sol is present per 100 parts by weight of the resin composition on a dry weight basis.

Preferably, organic resin composition (B) has a hydroxyl number of at least 50.

Preferably, said chromate layer is coated in a weight of 10 to 150 mg/m² of elemental chromium.

Preferably, the silica of silica sol (A) has a specific surface area of 100 to 400 m²/g.

Preferably, said organic composite layer is coated by baking the coating composition at the maximum temperature of 100° to 200° C.

Preferably, the organic solvent of silica sol (A) is selected from the group consisting of n-butanol, isobutanol, ethyl cellosolve, butyl cellosolve, xylene, ethylene glycol, ethylene glycol n-propyl ether, dimethylacetamide, and mixtures thereof.

DETAILED DESCRIPTION OF THE INVENTION

The present invention will be described below in detail.

The starting stock material is zinc plated strip steel or zinc base alloy plated strip steel, which are sometimes referred to as zinc plated strip steel for brevity. The types of plating applied to steel substrates include all conventional zinc platings used for anti-corrosion purpose, for example, pure Zn plating, binary alloy platings such as Zn-Ni alloy platings with a nickel content of 8 to 16% by weight and Zn-Fe alloy platings with an iron content of 5 to 30% by weight, and ternary alloy platings such as Zn-Ni-Cr alloy platings and Zn-Co-Cr alloy platings. In addition, composite dispersion platings as typified by Zn-Co Cr-Al₂O₃ platings are acceptable. These zinc platings may be applied by either electroplating or hot dipping.

The zinc platings are applied to steel substrates in ordinary coating weights for imparting corrosion resistance thereto. That is, the coating weight of zinc plating is not particularly limited insofar as its purpose is achievable.

The zinc plated steel substrate is subjected to chromate treatment primarily for imparting high corrosion resistance and secondarily for enhancing adherence or receptivity to an overlying coating.

The chromate layer is coated in a weight of 5 to 500 mg/m², preferably 10 to 150 mg/m² calculated as elemental chromium. If the chromium coating weight is less than 5 mg/m², some substrate areas can be left uncoated, which is undesirable for corrosion resistance and coating adherence. In excess of 500 mg/m², no further improvement in corrosion resistance results and insulating film resistance is increased to such an extent as to deter welding and electrophoretic deposition. Chromate layers in a coating weight of 10 to 150 mg/m² provide better performance with respect to corrosion resistance, adherence, weldability and electrophoretic deposition.

The chromate treatment may be conducted by any conventional technique including coating chromate techniques using a roll coater, roll squeezer or the like, electrolytic chromate techniques, and reactive chromate techniques. The chromate bath contains a water-soluble chromium compound as a major component while any desired additives may be added thereto, for example, anions such as phosphate and fluoride ions, metal ions such as Zn, Ni and Co ions, and organic substances such as starch and methanol. It is also possible to add silica sol for improving corrosion resistance The proportion of $Cr^{6+}$ in the chromate layer should be up to 70% by weight based on the total chromium quantity. If the proportion of $Cr^{6+}$ exceeds 70% by weight, the chromate layer allows chromium to dissolve out during alkali degreasing.

On the chromate layer is applied a composite coating mainly composed of silica sol (A) and organic resin composition (B). The silica sol in the composite coating of the steel strip according to the present invention contributes to development of high corrosion resistance because silanol groups on the silica surface function to stabilize and hold zinc base corrosion products formed upon exposure to a corrosive environment.

Since it is impossible to apply silica sol alone to steel strips, the use of an organic resin binder is essential. The organic resin composition (B) used herein has a number average molecular weight Mn of at least 2,000 and desirably, a hydroxyl number H (KOH mg/resin g) of at least 50. Resins having an Mn of less than 2,000 are short in chain length and do not have a network structure. Such low molecular weight resins are ineffective as the silica binder and less compatible with silica sol, and can detract from corrosion resistance and coating adherence. The maximum number average molecular weight is not particularly limited The preferred upper limit is set at 100,000 because the increased electric resistance of the coating can deter electrophoretic deposition and spot welding.

The hydroxyl group in the organic resin is a functional group contributing to adherence. If the hydroxyl number is less than 50, there is a possibility that (1) the coating fails to provide close adherence to the underlying chromate layer and (2) the coating fails to provide close adherence to an overlying electrophoretic film after cationic electrophoretic deposition As a result, chromium will dissolve out of the chromate layer during alkali degreasing. If an organic composite coated steel strip on which an overlying film has been formed by electrophoretic deposition and a further overcoat (top coat) has been applied is exposed to a humid environment, the chromate to organic composite coating adherence and the organic composite coating to electrophoretic coating adherence become weak, resulting in coating separation. For these reasons, the organic resin should preferably have a hydroxyl number of at least 50. The maximum hydroxyl number is not particularly limited. However, if the hydroxyl number is extremely high, the resin can lose compatibility with silica sol and cause aggregation or agglomeration and gelation in preparing a coating composition.

The type of the organic resins used herein is not particularly limited. The organic resins include, for example, epoxy resins, acrylic resins, polyethylene resins, alkyd resins, and urethane resins, with the epoxy resins being preferred The epoxy resins include glycidyl epoxy, glycidyl amine, aliphatic epoxide, and cycloaliphatic epoxide resins. Among these epoxy resins, epichlorohydrin-bisphenol A epoxy resins are preferred for toughness and corrosion resistance. They are commercially available, for example, as Epicoat 1010, 1009, 1007 and 1004 from Shell Kagaku K.K.

Epoxy resins having dialkanolamine added to their terminal oxirane group are also desirable. By incorporating more primary hydroxyl groups in an epoxy resin in a more stable fashion, silica is more firmly bound in the coating The dialkanol amines used herein include diethanol amine, dipropanol amine, dibutanol amine, and the like.

If desired, the resin may be partially modified with urethane. Also, the resin may be blended with amine resins such as melamine and benzoguanamine as a crosslinking agent.

The silica sol (A) used herein is described in further detail.

The silica sol is an organic solvent dispersed silica sol which comprises silica dispersed in an organic solvent with a water content of up to 3.0% by weight wherein the silica has an organic deposit on its surface in an amount of up to 5.0% by weight, calculated as C, based on the total weight of the silica, an average particle size of 0.05 to 3.0 μm and a specific surface area of 50 to 800 m$^2$/g, preferably 50 to 400 m$^2$/g, more preferably 100 to 400 m$^2$/g.

As described in the preamble, several silicas including water dispersed silica sol, fumed silica, and hydrophobic silica are known to be blended in coating compositions of the type to which the present invention pertains However, the water dispersed silica sol is unsuitable for use in coating compositions because it tends to immediately precipitate and gel when blended with the above-mentioned organic resin due to the fact that water molecules are adsorbed to the surface of silica particles in hydration form.

The fumed silica is a fine powder of agglomerated silica particles having a siloxane bond therebetween and a silanol bond on the surface thereof. Several problems arise when fumed silica is blended in coating compositions. Mechanical shearing forces applied cause the coating composition to experience an acute rise of viscosity, making it difficult to apply the composition consistently on a commercial scale. The amount of fumed silica added to organic solvent is limited because thickening, precipitation and gelation occur with an increase of the amount.

The hydrophobic silica is also used to ensure that silica sol be dispersed in coating compositions. More particularly, silanol groups on the surface of silica particles are substituted with organic groups to render the silica particles hydrophobic for dispersion in an organic solvent. The hydrophobic silica, when blended in coating composition, is successful in maintaining compatibility with the organic resin and providing excellent adherence of the coating, but has lost the ability of stably holding zinc corrosion products formed under the coating upon exposure to a corrosive environment because few free silanol groups are available on the particle surface. As a result, corrosion resistance is substantially poor.

The silica sol specified in the present invention is to eliminate the above-mentioned problems of the conventional types of silica sol. Silica is dispersed in an organic solvent having a water content of up to 3.0% by weight to provide compatibility with the resin composition. By limiting the amount of organic matter deposited on the silica surface to 5.0% by weight or less, calculated as elemental carbon, based on the total weight of the silica and the specific surface area of silica to 50 to 800 m$^2$/g, there are available free silanol groups on the silica surface, which contribute to a corrosion resistance improvement.

If the water content of the organic solvent is in excess of 3.0% by weight, the silica sol becomes less compatible with the resin composition If more than 5% by weight, calculated as C, of organic matter is deposited on the silica surface, only few free silanol groups capable of stabilizing and holding corrosion products are available on the silica surface, resulting in a loss of corrosion resistance.

If the specific surface area of silica exceeds 800 m$^2$/g, the number of free silanol groups increases beyond the necessary level so that the silica sol tends to gel, making it difficult to prepare coating compositions and substantially impossible to apply to steel strip. With a specific surface area between 400 m$^2$/g and 800 m$^2$/g, there is a possibility that some coating compositions gel depending on a particular type of resin and are somewhat difficult to apply to steel strip. Therefore, the preferred upper limit of specific surface area is 400 m$^2$/g. With a specific surface area of less than 50 m$^2$/g, few free silanol groups are available on the silica surface, resulting in a loss of corrosion resistance. With a specific surface area in the range of from 100 to 400 m$^2$/g, the resulting coating exhibits a better profile of corrosion resistance and stability.

Further, the silica has an average particle size of 0.05 to 3.0 μm. The conventional silica sols generally contain silica particles of less than 0.05 μm size uniformly dispersed in a solvent without secondary agglomeration. We have discovered that such uniformly dispersed silica sol is detrimental to spot welding for the following reasons. In spot welding of coated steel strips, a welding electrode tip is quickly worn to reduce the electrode area and the welding current density therewith, failing to form a nugget. Silica acts as a resistor during spot welding because it is not pyrolyzed at welding temperatures of about 700° to 800° C. and has a non-conductive nature although the organic resin can be pyrolyzed at such temperatures. Uniform distribution of silica in the coating layer minimizes the conduction path available for welding, inducing welding sparks and facilitating electrode wear or damage. That is, uniformly distributed silica adversely affects spot welding. For better welding performance, it is thus necessary to prevent uniform dispersion of silica to thereby provide a sufficient conduction path. Bearing this in mind, we have examined the distribution of silica in the organic composite coating layer to find that weldability can be substantially improved by controlling the number of silica particles per unit area on an arbitrary cross section of the organic composite coating layer. More specifically, weldability is improved by controlling the number of silica secondary particles to $1 \times 10^9$ or less per square millimeter of a cross section of the organic composite layer because a sufficient conduction path is available during welding. If the number of silica secondary particles is less than $1 \times 10^4$ per square millimeter of a cross section of the organic composite layer, weldability is high, but only a reduced number of silanol groups are available on the silica surface with a loss of corrosion resistance. The number of silica secondary particles should be $1 \times 10^4$ or more per square millimeter of a cross section of the organic composite layer in order to ensure corrosion resistance. In order that the silica have a sufficient specific surface area to provide corrosion resistance and that a conduction path be available in the organic composite coating layer during welding, primary particles of silica in the coating composition should agglomerate into secondary particles which are present in the coating layer. Such an organic composite coating layer can be effectively produced by causing primary particles in the silica sol to undergo secondary agglomeration Primary particles of silica should preferably agglomerate into secondary particles having an average particle size of at least 0.05 μm which allow for efficient welding. In turn, secondary particles having an average particle size of more than 3.0 μm are undesirable in applying the coating composition to uniform thickness. Means for inducing secondary agglomeration is not particularly limited. One preferred method capable of adjusting the particle size to the above-defined range is to limit the total alkali metal content in the organic solvent of the silica sol to 0.01% by weight or lower. It is also useful to attach $Al^{3+}$ to the silica surface in an amount of 0.1 to 20.0% by weight of elemental aluminum based on the total silica weight. These two methods for secondary agglomeration mentioned above may be co-carried out.

The conventional silica sols generally contain about 0.05% by weight of alkali metal ions, for example, $Na^+$ in the form of $Na_2O$. If alkali metal oxides such as $Na_2O$ are contained in the silica sol, there is formed an electrical double layer in which alkali metal ions such as $Na^+$ coordinate on the silica particle surface as counter ions and a hydration layer surrounds them, so that repulsion between silica particles maintains a colloidal state and uniform dispersion, preventing secondary agglomeration. However, by limiting the alkali metal content in the organic solvent to 0.01% by weight or less, formation of an electrical double layer on the silica surface to provide electric charges is prevented, allowing primary particles to agglomerate into secondary particles having an average particle size of 0.05 to 3.0 $\mu$m.

The second useful method is attachment of $Al^{3+}$ to the silica surface. If $Al^{3+}$ is attached to the silica surface in an amount of 0.1% by weight or more, calculated as Al, based on the total silica weight, by adding basic aluminum chloride, for example, to silica sol, positively charged sites result. Since the silica itself has a negative charge, the silica particles as a whole become neutral due to charge offsetting. However, attachment of $Al^{3+}$ in an amount of more than 20.0% by weight, calculated as Al, based on the total silica weight causes undesirable displacement of corrosion resistance improving silanol groups. By attaching $Al^{3+}$ to the silica surface in an amount of 0.1 to 20.0% by weight of elemental aluminum based on the total silica weight, formation of an electrical double layer on the silica surface to provide electric charges is prevented, allowing primary particles to agglomerate into secondary particles having an average particle size of 0.05 to 3.0 $\mu$m The silica sol used in the present invention is prepared by adding an organic solvent to a water dispersed silica sol and distilling off water therefrom until the water content reaches 3.0% by weight or lower. The organic solvent in which silica is dispersed should have a lower evaporation rate than water. Such organic solvents include n-butanol, isobutanol, ethyl cellosolve, butyl cellosolve, xylene, ethylene glycol, ethylene glycol n propyl ether, dimethylacetamide alone and mixtures thereof. Moderate heating during distillation is recommended because excessive heating would cause silanol groups on the silica surface to react with an alcohol to form an ester, resulting in organic matter adhering to the silica surface in an amount of more than 5.0% by weight based on the total silica weight, adversely affecting corrosion resistance.

The coating composition preferably contains silica sol (A) and organic resin composition (B) in such amounts that 10 to 100 parts by weight of silica sol is present per 100 parts by weight of the resin composition on a dry basis. Corrosion resistance will be less desirable with less than 10 parts by weight of silica, whereas with more than 100 parts by weight of silica, excess silica will not remain compatible with the resin composition so that the resulting coating composition becomes difficult to apply to steel strip.

The solvents for the coating composition include various organic solvents, for example, alcohols, ketones, esters, glycols, and ethers For the stabilization of silica sol, it is desired that the coating composition have a water content of up to 1% by weight based on the total weight.

The coating composition may further contain a silane coupling agent, if desired, because linkages are formed between the base resin and silica so that silica is firmly bound. The conventional silane coupling agents include vinylsilanes, methacryloxysilanes, epoxysilanes, aminosilanes, and mercaptosilanes. Among them, aminosilanes are unsuitable because they are incompatible with the resin composition used herein. In addition, addition of the silane coupling agent in excess amounts is detrimental to corrosion resistance because it bonds with a corrosion resistance improving silanol group on the silica surface to extinguish the useful silanol group. Therefore, it is recommended to add at most 20 parts by weight of silane coupling agent to 100 parts by weight of silica.

The coating composition as formulated above is applied to the chromate layer on the steel substrate to form an organic composite layer thereon by any desired commercial method including roll coating and air knife coating methods. The organic composite layer has a dry weight of 0.2 to 3.0 g/m$^2$. Less than 0.2 g/m$^2$ is too thin to improve to corrosion resistance whereas more than 3.0 g/m$^2$ results in an increased film resistance which will adversely affect spot welding and electrophoretic deposition.

The organic composite layer is finally baked, preferably at the maximum temperature of 100° to 200° C. on the strip surface. Baking temperatures of lower than 100° C. are insufficient for drying and leave some solvent in the coating, leading to a loss of corrosion resistance. Baking temperatures of higher than 200° C. will introduce yield elongation in the steel substrate so that stretcher strains are induced during subsequent pressing.

The organic composite coated steel strips of the present invention exhibit improved corrosion resistance and coating adherence, ensure satisfactory welding, and are useful in a variety of applications including automobile bodies.

EXAMPLE

Examples of the present invention are given below together with comparative examples by way of illustration and not by way of limitation. Unless otherwise stated, percents are by weight.

EXAMPLES

Low carbon cold rolled steel strips of 0.7 mm thick were coated with zinc or zinc alloy platings as shown in Table 4, subjected to coating chromate treatment using a roll coater as shown in Table 4, baked at the maximum strip temperature of 130° C., coated with coating compositions to form organic composite coatings as shown in Table 3 using a roll coater, baked at the maximum strip temperature of 160° C., cooled with water, and dried before they were examined by various tests. Tables 1 and 2 show the base resin and the silica sol of the coating compositions, respectively. All the resin compositions and the coating compositions were prepared by typical methods (1) and (2) later described for coating composition No. 11.

In Table 2, the specific surface area of silica was measured by the BET method using $N_2$ gas, and the average particle size by the particle size distribution measurement by centrifugal settling. In Tables 2 and 3, ETC is ethyl cellosolve, NPC is ethylene glycol n-propyl ether, and BT is n-butanol. In Table 2, the organic deposit is expressed in % by weight of carbon based on the total silica weight, and the Al content is expressed in % by weight of aluminum based on the total silica weight. In Table 3, the amounts of the resin composition and the silica blended are on a dry basis. In Table 4, plating column, Zn-Ni is a Zn-Ni alloy plating containing 12% of nickel, plating A is a Zn-Ni-Cr alloy plating consisting of 12% of Ni, 1% of Cr and the balance of Zn, and plating B is a Zn Co-Cr $Al_2O_3$ dispersion plating consisting of 1% of Co, 0.8% of Cr, 1% of $Al_2O_3$, and the balance of Zn.

The number of silica secondary particles in a cross section of the coating layer reported in Table 4 was determined by slicing the coating layer to a thickness of 500 Å by means of a microtome, observing the slice under a transmission electron microscope, and counting the number of silica secondary particles per unit area.

The following performance evaluation tests were carried out.

Corrosion resistance

A combined cycle corrosion test was carried out, each cycle consisting of (1) salt water spraying for 4 hours with 5% NaCl solution at 35° C., (2) drying for 2 hours at 60° C., and (3) wetting for 2 hours at 95% RH and 50° C. The number of cycles repeated until red rust generation is reported.

Water resistant secondary adherence of coating

A coated specimen was subjected to phosphating treatment with PB L3020 (manufactured by Nihon Parkerizing K.K.), cationic electrophoretic deposition with Power Top U-600 (manufactured by Nihon Paint K.K.) to 20 μm, baked at 170° C. for 20 minutes, and overcoated with Lugabake White (manufactured by Kansai Paint K.K.) to 35 μm, and baked at 140° C. for 30 minutes. After immersion in pure water at 40° C. for 10 days, the specimen was scribed with a cutter to define a pattern of 10×10 sections each 2 mm square. The percent of remaining coating sections after adhesive tape peeling was determined to evaluate the water resistant secondary adherence of the coating.

Chromium dissolution

A coated specimen was treated in four steps of degreasing, water washing, surface conditioning, and chemical conversion with a phosphate solution PB L3020 (manufactured by Nihon Parkerizing K.K.). The amount of chromium before and after the treatment were measured by a fluorescent X-ray analyzer to determine the amount of chromium dissolved out ($mg/m^2$).

Electrophoretic deposition

An electrocoat was applied to a coated specimen by conducting electricity at a voltage of 100 volts for 180 seconds in Power Top U-600 (manufactured by Nihon Paint K.K.) at 28° C., and baking at 170° C. for 20 minutes. The number of gas pinholes in the electrocoat was counted. Evaluation was made according to the following criterion.
○: 0–6 pinholes/$cm^2$
Δ: 7–10 pinholes/$cm^2$
X: more than 10 pinholes/$cm^2$

Weldability

Using a welding torch of copper-chromium alloy having a tip diameter of 6 mm, continuous welding was carried out with a current of 9 kA and a resistance welding time of 10 Hz under a pressure of 200 kgf. The number of spot welds that could be made without interruption was counted until nugget has not come to be formed. Weldability was evaluated according to the following criterion.
○: more than 3,000 spots
Δ: 1,000–3,000 spots
X: less than 1,000 spots (1) Preparation of terminally amine-modified epoxy resin varnish A reactor equipped with a reflux condenser, stirrer, thermometer, and nitrogen gas inlet was charged with 300 grams of Epicoat 1009 (epoxy resin having an epoxy equivalent of 3,000 manufactured by Shell Kagaku K.K.) and 467 grams of ethyl cellosolve and heated to 80° C. to form a homogeneous solution. To the solution was added dropwise 10.5 grams of diethanol amine over one hour. The reaction was continued for 3 hours at 80° C., obtaining an epoxy resin varnish having a solid content of 40%. The end of reaction was identified by detecting extinction of an epoxy group by chemical analysis. (2) Preparation of solvent dispersed silica-containing coating composition To 45 grams of the terminally amine-modified epoxy resin varnish obtained in (1) were added 60 grams of silica sol dispersed in ethyl cellosolve (specific surface area 150 $m^2/g$, water content 2%, $Na_2O$ 0.005% or less, average particle size 0.3 μm, solids 20%) and 95 grams of ethyl cellosolve. The mixture was agitated for 10 minutes by means of a dispersion mixer, obtaining a solvent dispersed silica-containing coating composition (solids 15%).

TABLE 1

| | Resin | | |
|---|---|---|---|
| No. | Type | Number average molecular weight Mn | Hydroxyl number mg KOH/g |
| 1 | Epoxy (Epicoat 1009*) | 3750 | 160 |
| 2 | Terminally amine-modified No. 1 | 3800 | 185 |
| 3 | 30% urethane-modified No. 2 | 4000 | 160 |
| 4 | Epoxy (Epicoat 1001*) | 900 | 170 |
| 5 | Acryl | 8000 | 40 |

*Shell Kagaku K.K.

TABLE 2

| Silica sol No. | Solvent | Silica type | Water Content wt % | Total alkali metal content wt % | Al content wt % | Organic deposit on surface wt % (calculated as C) | Average particle size μm | Specific surface area $m^2/g$ | Silica content wt % | Stability |
|---|---|---|---|---|---|---|---|---|---|---|
| 1 | ETC | Wet | 2.0 | <0.005 | 0.01 | 1.00 | 0.25 | 150 | 20 | Good |
| 2 | ETC | Wet | 2.0 | <0.005 | 0.01 | 1.00 | 0.30 | 350 | 20 | Good |
| 3 | ETC | Wet | 2.0 | <0.005 | 0.01 | 1.00 | 0.45 | 600 | 20 | Partial |

TABLE 2-continued

| Silica sol No. | Solvent | Silica type | Water Content wt % | Total alkali metal content wt % | Al content wt % | Organic deposit on surface wt % (calculated as C) | Average particle size μm | Specific surface area m²/g | Silica content wt % | Stability |
|---|---|---|---|---|---|---|---|---|---|---|
| 4 | ETC | Wet | 2.0 | <0.005 | 0.01 | 1.00 | 0.40 | 60 | 20 | settling Good |
| 5 | ETC | Wet | 2.0 | <0.005 | 0.01 | 1.00 | 0.30 | 40 | 20 | Good |
| 6 | ETC | Wet | 2.0 | 0.020 | 0.01 | 1.00 | 0.04 | 150 | 20 | Good |
| 7 | ETC | Wet | 2.0 | <0.005 | 0.01 | 6.00 | 0.50 | 150 | 20 | Good |
| 8 | BT | Wet | 2.0 | <0.005 | 0.01 | 1.00 | 0.20 | 150 | 20 | Good |
| 9 | NPC | Wet | 2.0 | <0.005 | 0.01 | 1.00 | 0.30 | 150 | 20 | Good |
| 10 | ETC | Wet | 4.0 | <0.005 | 0.01 | 1.00 | — | 150 | 20 | Gel |
| 11 | water | Wet | 80.0 | <0.005 | 0.01 | 0.01 | 0.01 | 150 | 20 | Good |
| 12 | ETC | Dry | 2.0 | <0.005 | 0.01 | 0.01 | — | 150 | 20 | Gel |
| 13 | ETC | Wet | 2.0 | <0.005 | 0.01 | 1.00 | 3.1 | 150 | 20 | Good |
| 14 | ETC | Wet | 2.0 | 0.02 | 0.05 | 1.00 | 0.02 | 150 | 20 | Good |
| 15 | ETC | Wet | 2.0 | 0.02 | 1.00 | 1.00 | 0.30 | 150 | 20 | Good |
| 16 | ETC | Wet | 2.0 | 0.02 | 22.0 | 1.00 | 0.50 | 150 | 20 | Good |

TABLE 3

| Coating Composition No. | Resin Type | Resin Amount wt % | Silica Type | Silica Amount wt % | Solvent Type | Solvent Amount wt % | Stability |
|---|---|---|---|---|---|---|---|
| 1 | 1 | 9.0 | 1 | 6.0 | ETC | 85.0 | Good |
| 2 | 1 | 9.0 | 2 | 6.0 | ETC | 85.0 | Good |
| 3 | 2 | 9.0 | 3 | 6.0 | ETC | 85.0 | Partial gelation |
| 4 | 1 | 9.0 | 4 | 6.0 | ETC | 85.0 | Good |
| 5 | 1 | 9.0 | 5 | 6.0 | ETC | 85.0 | Good |
| 6 | 1 | 9.0 | 6 | 6.0 | ETC | 85.0 | Good |
| 7 | 1 | 9.0 | 7 | 6.0 | ETC | 85.0 | Good |
| 8 | 1 | 9.0 | 8 | 6.0 | BT | 85.0 | Good |
| 9 | 1 | 9.0 | 9 | 6.0 | NPC | 85.0 | Good |
| 10 | 1 | 9.0 | 11 | 6.0 | water | 85.0 | Gel |
| 11 | 2 | 9.0 | 1 | 6.0 | ETC | 85.0 | Good |
| 12 | 3 | 9.0 | 1 | 6.0 | ETC | 85.0 | Good |
| 13 | 4 | 9.0 | 1 | 6.0 | ETC | 85.0 | Good |
| 14 | 5 | 9.0 | 1 | 6.0 | ETC | 85.0 | Good |
| 15 | 1 | 14.0 | 1 | 1.0 | ETC | 85.0 | Good |
| 16 | 1 | 8.0 | 1 | 7.0 | ETC | 85.0 | Good |
| 17 | 1 | 14.5 | 1 | 0.5 | ETC | 85.0 | Good |
| 18 | 1 | 6.0 | 1 | 9.0 | ETC | 85.0 | Partial gelation |
| 19 | 1 | 9.0 | 13 | 6.0 | ETC | 85.0 | Good |
| 20 | 1 | 9.0 | 14 | 6.0 | ETC | 85.0 | Good |
| 21 | 1 | 9.0 | 15 | 6.0 | ETC | 85.0 | Good |
| 22 | 1 | 9.0 | 16 | 6.0 | ETC | 85.0 | Good |

TABLE 4-1

| Example | Steel Strip Plating | Steel Strip Coating Weight g/m² | Chromate $Cr^{6+}$/total Cr | Chromate Coating Weight mg/m² | Coating Composition No. | Coating Composition Coating Weight mg/m² | Number of silica secondary particles/μm² | Form of silica |
|---|---|---|---|---|---|---|---|---|
| 1 | Zn—Ni | 20 | 0.5 | 50 | 1 | 1.0 | 200 | agglomeration |
| 2 | Zn—Ni | 20 | 0.5 | 50 | 2 | 1.0 | 40 | agglomeration |
| 3 | Zn—Ni | 20 | 0.5 | 50 | 4 | 1.0 | 10 | agglomeration |
| 1* | Zn—Ni | 20 | 0.5 | 50 | 5 | 1.0 | 50 | dispersion |
| 2* | Zn—Ni | 20 | 0.5 | 50 | 6 | 1.0 | 3800 | dispersion |
| 3* | Zn—Ni | 20 | 0.5 | 50 | 7 | 1.0 | 80 | agglomeration |
| 4 | Zn—Ni | 20 | 0.5 | 50 | 8 | 1.0 | 700 | agglomeration |
| 5 | Zn—Ni | 20 | 0.5 | 50 | 9 | 1.0 | 100 | agglomeration |
| 6 | Zn—Ni | 20 | 0.5 | 50 | 11 | 1.0 | 150 | agglomeration |
| 7 | Zn—Ni | 20 | 0.5 | 50 | 12 | 1.0 | 120 | agglomeration |
| 4* | Zn—Ni | 20 | 0.5 | 50 | 13 | 1.0 | 100 | agglomeration |
| 5* | Zn—Ni | 20 | 0.5 | 50 | 14 | 1.0 | 150 | agglomeration |
| 8 | Zn—Ni | 20 | 0.5 | 50 | 15 | 1.0 | 0.1 | agglomeration |
| 9 | Zn—Ni | 20 | 0.5 | 50 | 16 | 1.0 | 800 | agglomeration |
| 10 | Zn—Ni | 20 | 0.5 | 50 | 17 | 1.0 | 0.005 | agglomeration |
| 11 | A | 20 | 0.5 | 50 | 1 | 1.0 | 80 | agglomeration |
| 12 | B | 20 | 0.5 | 50 | 1 | 1.0 | 150 | agglomeration |
| 13 | B | 20 | 0.5 | 50 | 2 | 1.0 | 30 | agglomeration |

| Examples | Corrosion resistance test cycles | Weldability | Chromium dissolution mg/m² | Secondary adherence | Electorocoating |
|---|---|---|---|---|---|

TABLE 4-1-continued

| | | | | | |
|---|---|---|---|---|---|
| 1 | >200 | ◯ | <1 | 100% | ◯ |
| 2 | >200 | ◯ | <1 | 100% | ◯ |
| 3 | >200 | ◯ | <1 | 100% | ◯ |
| 1* | 120 | ◯ | <1 | 100% | ◯ |
| 2* | >200 | X | <1 | 100% | ◯ |
| 3* | 100 | ◯ | <1 | 100% | ◯ |
| 4 | >200 | ◯ | <1 | 100% | ◯ |
| 5 | >200 | ◯ | <1 | 100% | ◯ |
| 6 | >200 | ◯ | <1 | 100% | ◯ |
| 7 | >200 | ◯ | <1 | 100% | ◯ |
| 4* | 120 | ◯ | <1 | 40% | ◯ |
| 5* | 100 | ◯ | <1 | 100% | ◯ |
| 8 | 195 | ◯ | <1 | 100% | ◯ |
| 9 | >200 | ◯ | <1 | 100% | ◯ |
| 10 | 190 | ◯ | <1 | 100% | ◯ |
| 11 | >200 | ◯ | <1 | 100% | ◯ |
| 12 | >200 | ◯ | <1 | 100% | ◯ |
| 13 | >200 | ◯ | <1 | 100% | ◯ |

*Comparative Example

TABLE 4-2

| | Steel Strip | | Chromate | | Coating Composition | | | |
|---|---|---|---|---|---|---|---|---|
| Example | Plating | Coating Weight g/m$^2$ | $Cr^{6+}$/ total Cr | Coating Weight mg/m$^2$ | No. | Coating Weight mg/m$^2$ | Number of silica secondary particles/$\mu m^2$ | Form of silica |
| 6* | Zn—Ni | 20 | 0.8 | 50 | 2 | 1.0 | 20 | agglomeration |
| 7* | Zn—Ni | 20 | 0.5 | 600 | 2 | 1.0 | 40 | agglomeration |
| 14 | Zn—Ni | 20 | 0.5 | 50 | 2 | 0.3 | 5 | agglomeration |
| 15 | Zn—Ni | 20 | 0.5 | 50 | 2 | 2.8 | 20 | agglomeration |
| 8* | Zn—Ni | 20 | 0.5 | 50 | 2 | 0.1 | 15 | agglomeration |
| 9* | Zn—Ni | 20 | 0.5 | 50 | 2 | 3.5 | 30 | agglomeration |
| 10* | Zn—Ni | 20 | 0.5 | 50 | 19 | 1.0 | 0.02 | agglomeration |
| 11* | Zn—Ni | 20 | 0.5 | 50 | 20 | 1.0 | 2500 | dispersion |
| 16 | Zn—Ni | 20 | 0.5 | 50 | 21 | 1.0 | 80 | agglomeration |
| 12* | Zn—Ni | 20 | 0.5 | 50 | 22 | 1.0 | 200 | agglomeration |
| 17 | Zn—Ni | 20 | 0.5 | 50 | 3 | 1.0 | 50 | agglomeration |

| Example | Corrosion resistance test cycles | Weldability | Chromium dissolution mg/m$^2$ | Secondary adherence | Electoro- coating |
|---|---|---|---|---|---|
| 6* | >200 | ◯ | 25 | 100% | ◯ |
| 7* | >200 | X | 20 | 100% | X |
| 14 | >200 | ◯ | <1 | 100% | ◯ |
| 15 | >200 | ◯ | <1 | 100% | ◯ |
| 8* | 120 | ◯ | 15 | 100% | ◯ |
| 9* | >200 | X | <1 | 100% | X |
| 10* | 160 | ◯ | <1 | 100% | ◯ |
| 11* | 180 | X | <1 | 100% | ◯ |
| 16 | >200 | ◯ | <1 | 100% | ◯ |
| 12* | 150 | ◯ | <1 | 100% | ◯ |
| 17 | >200 | ◯ | <1 | 100% | ◯ |

As is evident from Table 4, the examples falling with the scope of the present invention are organic composite coated steel strips having improved corrosion resistance and weldability.

Although some preferred embodiments have been described, many modifications and variations may be made thereto in the light of the above teachings. It is therefore to be understood that within the scope of the appended claims, the invention may be practiced otherwise than as specifically described.

We claim:

1. An organic composite coated steel strip having improved corrosion resistance and weldability, comprising
   a zinc or zinc base alloy plated steel substrate,
   a chromate layer on the substrate containing up to 70% by weight of $Cr^{6+}$ based on a total chromium quantity, said chromate layer being coated in a weight of 5 to 500 mg/m$^2$ of elemental chromium, and
   an organic composite layer coated on said chromate layer made from a coating composition comprising
   (A) a silica sol having silica dispersed in an organic solvent, the silica having an organic deposit on a surface thereof in an amount of up to 5.0% by weight calculated as elemental carbon C and (B) an organic resin composition having a number average molecular weight of at least 2,000, and wherein
   (a) the silica primary particles are agglomerated into secondary particles and (b) the number of the secondary particles ranges from $1 \times 10^4$ to $1 \times 10^9$/mm$^2$ per square millimeter of a cross section of said organic composite layer, and (c) said organic composite layer has dry weight of 0.2 to 3.0 g/m$^2$.

2. The steel strip of claim 1 wherein said organic resin composition is based on an epichlorohydrin-bisphenol A epoxy resin having a number average molecular weight of at least 2,000.

3. The steel strip of claim 1 wherein said coating composition contains said silica sol and said organic resin composition.

4. The steel strip of claim 1 wherein said organic resin composition has a hydroxyl number of at least 50.

5. The steel strip of claim 1 wherein said chromate layer is coated in a weight of 10 to 150 mg/m² of elemental chromium.

6. An organic composite coated steel strip having improved corrosion resistance and weldability, comprising zinc or zinc base alloy plated steel substrate, a chromate layer on the substrate containing up to 70% by weight of $Cr^{6+}$ based on a total chromium quantity, said chromate layer being coated in a weight of 5 to 500 mg/m² of elemental chromium, and an organic composite layer coated on said chromate layer, said organic composite layer being made from a coating composition comprising (A) a silica sol having silica dispersed in an organic solvent with a water content of up to 3.0% by weight, the silica having an organic deposit on a surface thereof in an amount of up to 5.0% by weight, calculated as elemental carbon, based on the total weight of the silica, the silica having a specific surface area of 50 to 800 m²/g, and (B) an organic resin composition having a number average molecular weight of at least 2,000, said organic composite layer being coated in a dry weight of 0.2 to 3.0 g/m².

7. The steel strip of claim 6 wherein the silica of said silica has an average particle size of 0.05 to 3.0 μm.

8. The steel strip of claim 6 wherein the organic solvent of said silica sol has a total alkali metal content of up to 0.01% by weight.

9. The steel strip of claim 6 wherein the silica of said silica sol has $Al^{3+}$ adhered to the surface of silica in an amount of 0.1 to 20.0% by weight of elemental Al based on the total weight of the silica.

10. The steel strip of claim 6 wherein said organic resin composition is based on an epichlorohydrin-bisphenol A epoxy resin having a number average molecular weight of at least 2,000.

11. The steel strip of claim 6 wherein said coating composition contains said silica sol and said organic resin composition in such amounts that 10 to 100 parts by weight of silica sol is present per 100 parts by weight of the resin composition on a dry weight basis.

12. The steel strip of claim 6 wherein said organic resin composition has a hydroxyl number of at least 50.

13. The steel strip of claim 6 wherein said chromate layer is coated in a weight of 10 to 150 mg/m² of elemental chromium.

14. The steel strip of claim 6 wherein the said silica of silica sol has a specific surface area of 100 to 400 m²/g.

15. The steel strip of claim 6 wherein said organic composite layer is formed by baking the coating composition at a maximum temperature of 100° to 200° C.

16. The steel strip of claim 6 wherein the organic solvent of said silica sol is selected from the group consisting of n-butanol, isobutanol, ethyl cellosolve, butyl cellosolve, xylene, ethylene glycol, ethylene glycol n-propyl ether, dimethylacetamide, and mixtures thereof.

* * * * *

UNITED STATES PATENT AND TRADEMARK OFFICE
CERTIFICATE OF CORRECTION

PATENT NO. : 5,294,485
DATED : March 15, 1994
INVENTOR(S) : Kenji Takao et al

It is certified that error appears in the above-indentified patent and that said Letters Patent is hereby corrected as shown below:

Columns 11-12,
In Table 2-continued, column headed "Organic deposit on surface wt% (calculated as C)",
    line 8, delete "0.01" and substitute --<0.01--
    line 9, delete "0.01" and substitute --<0.01--.

In column 14, line 68, after "composition" insert --in such amounts that 10 to 100 parts by weight of silica is present per 100 parts by weight of the resin composition on a dry weight basis--.

In column 15, line 33, after "silica" insert --sol--.

Signed and Sealed this

Fifth Day of July, 1994

Attest:

BRUCE LEHMAN

Attesting Officer

Commissioner of Patents and Trademarks